United States Patent [19]

Baker et al.

[11] 4,182,795
[45] Jan. 8, 1980

[54] FUEL CELL THERMAL CONTROL AND REFORMING OF PROCESS GAS HYDROCARBONS

[75] Inventors: Bernard S. Baker, Brookfield Center; Dilip J. Dharia, Danbury, both of Conn.

[73] Assignee: Energy Research Corporation, Danbury, Conn.

[21] Appl. No.: 923,370

[22] Filed: Jul. 10, 1978

[51] Int. Cl.$^2$ ............................................. H01M 8/18
[52] U.S. Cl. ...................................... 429/13; 429/19; 429/26
[58] Field of Search ....................... 429/13, 24, 26, 39, 429/34, 17, 19

[56] References Cited

U.S. PATENT DOCUMENTS

| | | | |
|---|---|---|---|
| 3,394,032 | 7/1968 | Danner | 429/26 |
| 3,801,374 | 4/1974 | Dews | 429/26 |
| 3,880,670 | 4/1975 | Shinn | 429/34 |
| 3,964,930 | 6/1976 | Reiser | 429/26 |

*Primary Examiner*—Donald L. Walton
*Attorney, Agent, or Firm*—Watson, Leavenworth, Kelton & Taggart

[57] ABSTRACT

Thermal control and fuel processing in fuel cell operation is effected through sensible heat of process gas and hydrocarbon reforming by supplying process gas in common to a flow passage in communication with the cell electrolyte and an additional gas flow passage which is isolated from the cell electrolyte and includes catalyst promoting endothermic reforming of hydrocarbon content of the process gas. Flow level in the electrolyte-communicative flow passage is selected based on desired output electrical energy and flow level in the additional gas flow passage is selected in accordance with desired cell operating temperature and desired extent of fuel processing.

31 Claims, 14 Drawing Figures

FUEL CELL THERMAL CONTROL AND REFORMING OF PROCESS GAS HYDROCARBONS

FIELD OF THE INVENTION

This invention relates to fuel cells wherein reactant or product gas is conducted to or from the cells. The invention relates more particularly to thermal control and fuel processing in such cells.

BACKGROUND OF THE INVENTION

In the design of fuel cells and like electrical energy producing devices involving reactant or product gas undergoing electrochemical reaction (process gas), thermal control is a dominant parameter. The electrochemical reactions in such devices are invariably accompanied by heat generation or heat absorpotion because of entropy changes accompanying the reaction and irreversibilities caused by diffusion and activation overpotentials and ohmic resistance. In the accommodation of thermal control, the art has looked to various techniques, none of which are entirely satisfactory.

The thermal control technique seemingly most desirable takes advantage of the sensible heat of the process gas itself as a vehicle for thermal control. Thus, if removal of heat from the cell is desired, the incoming process gas may be supplied to the cell at a temperature lower than the cell operating temperature such that exiting gas removes heat simply by increase in temperature thereof in passage through the cell. In this technique, one adjusts the process gas flow level above the flow level required for production of preselected measure of electrical energy, such additional process gas serving the heat removal function. Disadvantages attending this practice include undesirable pressure drops based on the increased process gas flow, auxiliary power penalty and loss of electrolyte through vaporization or entrainment. By auxiliary power is meant the power requirements of apparatus accessory to the fuel cell proper, e.g., gas pumps, pressurizing systems and the like. As respects electrolyte loss, all process gas in this gas sensible heat technique is in communication with the cell electrolyte in its passage through the cell and, where substantial additional gas is required for thermal control, a very high electrolyte loss due to saturating of the gas with electrolyte vapor is observed in electrolyte gas resulting in quite high electrolyte loss.

In a second thermal control technique, the art has looked to limiting the temperature gradients inside fuel cells by employment of a bipolar plate having an extended fin disposed outside the cell proper, as shown in U.S. Pat. No. 3,623,913 to Adlhart et al. While this technique provides a somewhat more uniform cell temperature, high gas flow passing directly through the cell can result in high electrolyte loss and increased auxiliary power.

A third thermal control technique relies on the sensible heat of a dielectric liquid. Such sensible-heat liquid approach requires much lower auxiliary power as compared to the gaseous heat transfer medium, but requires a separate heat transfer loop and an electrically isolated manifolding system. To avoid shunt currents betwen stacked cells, dielectric fluids such as fluorocarbon or silicon-based oils have been traditionally used as the heat transfer media. Because the catalyst material may be poisoned severely by even a trace amount of these dielectric fluids, a small leak from the heat transfer loop may be fatal to the cell. Also, the dielectric liquids are flammable and have toxic reaction products.

In a fourth technique for thermal control, the art has relied on the latent heat of liquids. Latent heat liquids (U.S. Pat. Nos. 3,498,844 and 3,507,702 to Sanderson; U.S. Pat. No. 3,761,316 to Stedman; and U.S. Pat. No. 3,969,145 to Grevstad et al.) can provide heat transfer at nearly uniform temperature, although there may be some temperature gradients in the stacking direction if the heat transfer plate is placed between a group of cells. The auxiliary power requirements are expected to be extremely low. Suitable dielectric fluids having boiling points in the range of cell operating temperature can be used, but the disadvantages of the sensible-heat liquid approach apply here also. To overcome these disadvantages, non-dielectric media, such as water, can be used. If water is used, a suitable quality steam can be generated for use in other parts of the plant. External heat exchange also is expected to be efficient because of high heat transfer coefficients. Unfortunately, the use of a non-dielectric liquid necessitates elaborate corrosion protection schemes (U.S. Pat. No. 3,969,145 to Grevstad et al.; U.S. Pat. No. 3,923,546 to Katz et al.; U.S. Pat. No. 3,940,285 to Nickols et al.) and/or the use of an extremely low conductivity liquid. During operation, the conductivity may increase, so means to restore the low conductivity may also be required. If the cooling loop is under pressure, good seals are necessary. If a leak develops during the life of the stack because of pinholes caused by corrosion or deterioration of seals, it could paralyze the entire system. Because of the corrosion protection requirements and intricate manifolding, the cost of the heat transfer subsystem operating on dielectric coolant could be substantial.

In a first U.S. patent application, Ser. No. 923,368, commonly-assigned herewith and field on even date, a fundamentally different approach to thermal control of fuel cells is set forth which provides for supplementing the flow of process gas through an electrochemical cell, in measure required for thermal control by sensible heat of process gas, in manner both avoiding electrolyte loss and pressure drop increase across the cell. In implementing this process gas sensible-heat technique, the invention of such commonly-assigned application introduces, in addition to the customary process gas passage in communication with the cell electrolyte, a process gas passage in the cell which is isolated from the cell electrolyte and in thermal communication with a heat-generating surface of the cell. Such electrolyte-communicative and electrolyte-isolated passages are commonly manifolded to a pressurized supply of process gas. The flow levels in the respective passages are set individually by passage parameters to provide both for desired level electrical energy cell output and desired heat removal.

In a second U.S. patent application, Ser. No. 923,369, also commonly-assigned herewith and filed on even date, electrochemical cell structure is set forth for implementing the thermal control technique of said first U.S. patent application wherein such electrolyte-isolated passages are so arranged as to have gas-confining walls contiguous with the electrode served with process gas by the electrolyte-communicative passages. Integral sheet material is preferably corrugated to define channels opening into the electrode and successive alternate channels closed from the electrode by the sheet material.

Apart from the foregoing thermal control techniques, applicants herein have considered the desirability of so-called "reforming" of hydrocarbon content of process gas. Fuel cell gas streams frequently contain methane and other hydrocarbons. The heat value, and hence electrical energy producing potential of methane is about three to four times greater than that of hydrogen. Since methane itself is relatively electrochemically inactive, it is very desirable to reform methane to form hydrogen and carbon monoxide in accordance with the reaction: $CH_4 + H_2O \rightarrow 3H_2 + CO$. The hydrogen and carbon monoxide can then participate in the fuel cell reaction either directly or by further water-gas shift. An incentive for carrying out such reforming reaction in a fuel cell is that the reaction is endothermic and would serve to offset heat generated in fuel cell operation due to inherent irreversibility. Accordingly, internal reforming of fuel can reduce the load on the fuel cell cooling system. Introduction of a reforming catalyst in the path of reactive process gas would serve to realize the foregoing advantages. However, since the reforming reaction is endothermic, it creates cold spots for the electrolyte vapor to condense and, in turn, catalyst activity in promoting reforming would be substantially reduced.

SUMMARY OF THE INVENTION

It is an object of the present invention to provide for efficient use of hydrocarbon reforming in the thermal control of fuel cells.

It is a further object of the invention to provide for in situ hydrocarbon reforming in fuel cells in manner preventing catalyst deactivation by condensation of fuel cell electrolyte vapor.

In attaining the foregoing and other objects, the invention provides thermal control in an electrochemical cell jointly through sensible heat of process gas and hydrocarbon reforming by conducting process gas through a passage formed in or juxtaposed with the cell which is isolated from the cell electrolyte and which includes catalyst promotive of reforming process gas hydrocarbon content. Other customary passage in communication with the electrolyte is provided in the cell and supplied with process gas for reaction purposes. Output gas from both passages is cooled prior to recirculation through the cell, with the gas exiting from the reforming passage being subjected to treatment removing substance therefrom (e.g. condensing the carbonates vapor) which retards promotive reforming activity of the catalyst.

In series cell application, the invention conveys the products of hydrocarbon reforming in a prior cell to a subsequent cell for entry thereof into process gas reaction producing electrical energy.

The foregoing and other objects and features of the invention will be further understood from the following detailed discussion thereof and from the drawings wherein like reference numerals identify like parts throughout.

DESCRIPTION OF EXPLANATORY PREFERRED EMBODIMENTS AND PRACTICES

Figure 1:
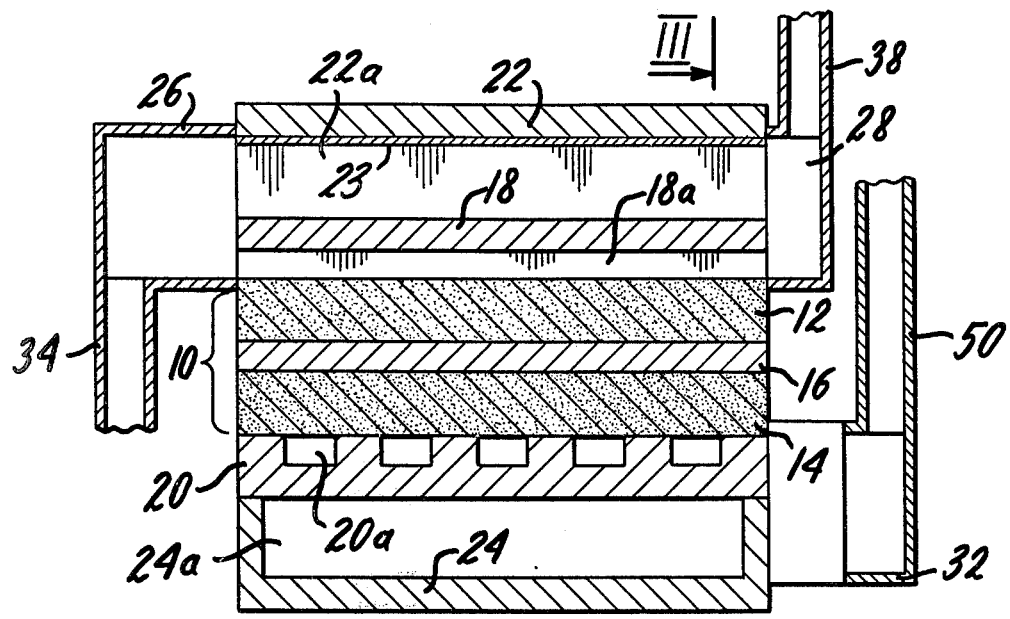
FIG. 1 is a sectional drawing of an explanatory embodiment of an electrochemical cell in accordance with the invention, as seen along plane I—I of FIG. 2.
Figure 3:
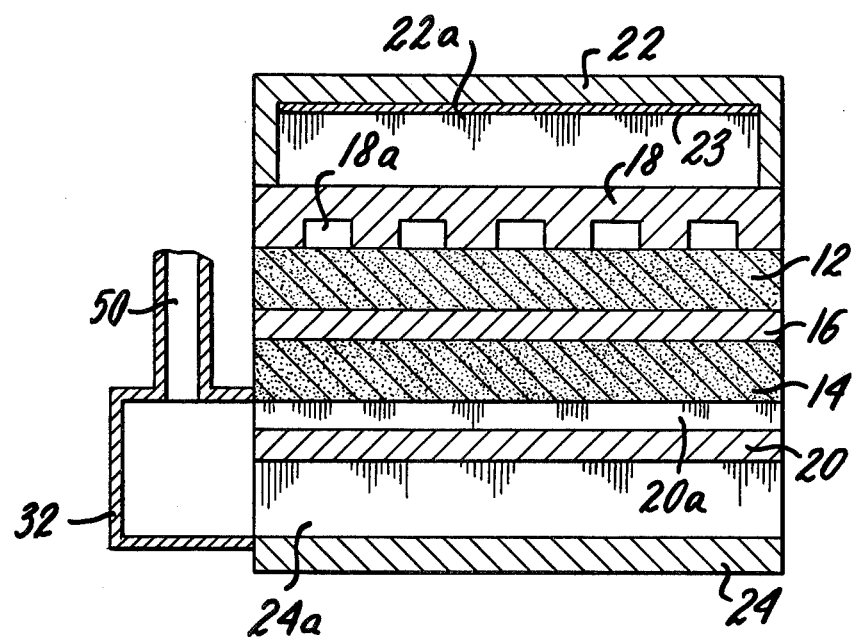
FIG. 3 is a sectional view of the FIG. 1 fuel cell as seen along plane III—III of FIG. 1.

In FIGS. 1 and 3, fuel cell 10 includes anode and cathode electrodes 12 and 14, of customary gas diffusion type, and electrolyte matrix or layer 16 therebetween. Separator plates 18 and 20 are shown in the explanatory FIG. 1 single cell embodiment as being of unipolar character, defining channel passages 18a, for supplying fuel/process gas to anode electrode 12, and passages 20a, for supplying oxidant/process gas to cathode electrode 14. Based on the gas diffusion character of electrodes 12 and 14, passages 18a and 20a constitute electrolyte-communicative passages.

In accordance with the invention, thermal control plate 22, having reforming catalyst layers or packings 23, is stacked on separator plate 18. Plate 22 includes conduit passage 22a extending in like direction, i.e., across the plane of FIG. 1, with passages 18a and is commonly connected therewith by input anode gas manifold 26 and output anode gas manifold 28.

Thermal control plate 24, constructed as in the first-mentioned patent application above, includes conduit passage 24a not containing catalyst and extending in like direction, i.e., into the plane of FIG. 1, with passages 20a and is commonly connected therewith by input cathode gas manifold 30 (FIG. 2) and output cathode gas manifold 32. Since separator plates 18 and 20 are essentially gas-impermeable, thermal control plate passages 22a and 24a constitute electrolyte-isolated passages. Thus, process gases, i.e., fuel gas supplied from manifold 26 and oxidant gas supplied from manifold 30, present in passages 22a and 24a can be conducted through the fuel cell to serve thermal control purposes and, in the case of reforming passage 22a, without contributing to electrolyte loss and without resulting in electrolyte blockage due to condensation of electrolyte vapor on cold spots resulting from the endothermic reforming reaction in the fuel gas passage. To the contrary, process gases conducted through channels 18a and 20a give rise to exit gas unavoidably partially or fully saturated with electrolyte vapor. If catalyst is applied in channels 18a, reforming cold spots can result therein, as above discussed.

As is noted below fuel cells may employ thermal control plates for one or the other of the process gases. Where desired, exit admixing of process gas conducted through electrolyte-communicative and electrolyte-isolated passages may be dispensed with in favor of common manifolding solely of input process gas supplied to such diverse character passages. Also, as discussed below, the present invention contemplates the introduction of electrolyte-isolated, catalyst-containing process gas passages, commonly input manifolded with a process gas supply, individually per plural cells in a stack of fuel cells.

Referring again to FIG. 2, input anode gas manifold 26 is supplied through feed conduit 34, which is in turn fed from pressurized input anode gas supply 36. Process gas from supply 36 may be admixed with, and thus supplemented by, process gas theretofore conducted through the fuel cell. For this purpose, output gas from manifold 28 is conducted through conduit 38 to unit 40, which serves both heat exchange and the removal of catalyst-contaminating substances, and thence to a mixing valve in supply 36. By operation of valve 42, gas may be funneled to purge conduit 44, as desired. To remove heat from gas conducted through conduit 38 prior to recirculation, as is typical, unit 40 is of heat reducing type whereby gas supplied from unit 40 to supply 36 is of temperature lower than the cell operating temperature.

For thermal treatment, purging and recirculation of cathode process gas, counterpart components include feed conduit 46, pressurized input cathode gas supply 48, output gas conduit 50, purge valve 52, purge conduit 54 and unit 56, which corresponds to unit 40 in terms of cooling the process gas.

In implementation of methods of the invention, process gas flow is established at a level or levels, as respects electrolyte-communicative passages 18a and/or 20a, to attain predetermined electrical energy to be produced by the electrochemical cell. Even assuming reversibility of electrochemical reactions in fuel cells, a recognized minimum amount of heat is liberated. Also, as alluded to above, irreversibility in fuel cells, resultant from activation, concentration and ohmic overpotentials, results in additional heat generation. Typically, in fuel cells, about fifty percent of input enthalpy shows up as heat and the remainder as such predetermined electrical energy. The heat energy may be ascribed as about one-fifth reversible heat and four-fifths heat due to irreversibility.

With process gas flow in passages 18a and 20a set in accordance with such predetermined desired electrical energy cell output, process gas flow in electrolyte-isolated passages, 22a and/or 24a, and catalyst content of passages 22a are now set to obtain a predetermined operating temperature range for the electrochemical cell. No completely analytical procedure applies, since input and exit orifice geometry, conduit skin friction, conduit length, manifold geometries and catalyst packing demand empirical test. The practice of achieving desired flows in the respective passages may include the placement of fixed or variably-settable constrictions in either or both passages.

Figure 4:
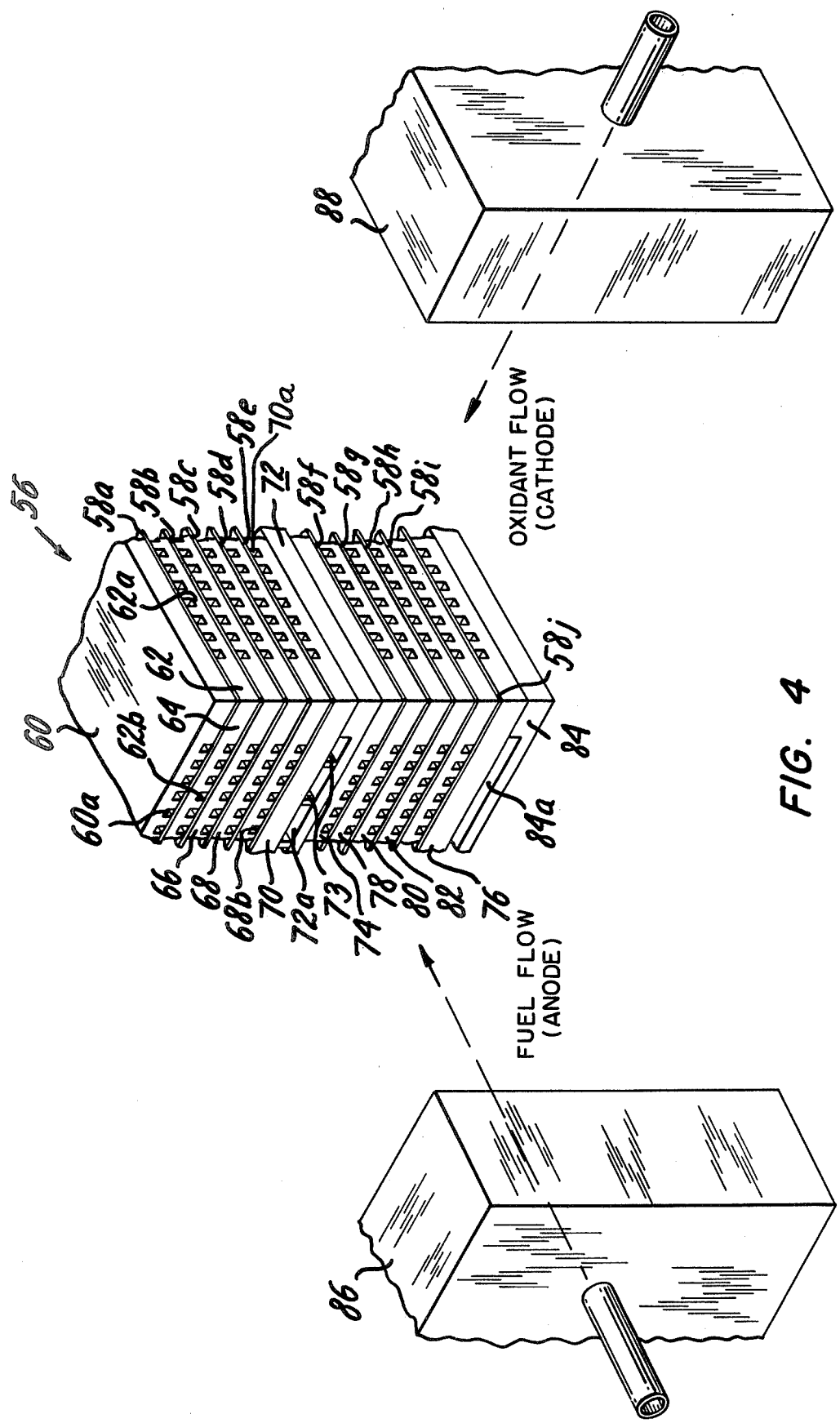
FIG. 4 is perspective illustrations of fuel cell stacks in accordance with the invention.

Referring to FIG. 4, a preferred embodiment of cell stack 56 is shown without associated electrical output connections and encasements. Electrolyte layers and gas diffusion anodes and cathodes are identified jointly as cell assemblies 58a–58j. The top separator plate 60 is of unipolar type having electrolyte-communicative channel passages 60a, as in the case of separator plate 18 of FIG. 1, and overlies the anode of top cell assembly 58a. Separator plate 62 is of bipolar type, defining electrolyte-communicative channel passages 62a, which underlie the cathode of top cell assembly 58a, and 62b which overlie the anode of second cell assembly 58b. Bipolar plates 64, 66 and 68 separate cell assemblies 58b, 58c and 58d, with plate 68 gas passages 68b overlying the anode of cell assembly 58e. Separator plate 70 is of unipolar type, having passages 70a underlying the cathode of cell assembly 58e. A sub-stack of five fuel cells is thus provided. Thermal control plate 72 is disposed beneath such sub-stack with its catalyst-containing conduit passage 72a in communication with heat-generating surface of the sub-stack, namely, the undersurface of separator plate 70. A like sub-stack of five fuel cells, inclusive of cell assemblies 58f–58j, is disposed beneath plate 72. Unipolar separator plates 74 and 76 are endwise of the sub-stack and bipolar separator plates 78, 80 and 82 are intermediate the sub-stack. Thermal control plate 84 is arranged with its catalyst-containing conduit passage 84a in communication with the undersurface of separator plate 76.

Input anode and cathode gas manifolds 86 and 88 are shown schematically and separated from stack 56. Based on the inclusion of thermal control plates 72 and 84 with anode gas conduit passages 72a and 84a, manifold 86 supplies process gas commonly to and through electrolyte-communicative and electrolyte-isolated, catalyst-containing passages. Cathode oxidant flow from manifold 88 is limited to electrolyte-communicative passages in this showing. In the illustrated arrangement, one electrolyte-isolated, catalyst-containing passage is associated with each sub-stack of five fuel cells. Where a thermal control plate is located between sub-stacks, as in the case of plate 72, it will serve to cool both such sub-stacks. Other assignment of thermal control plates per fuel cells may be made as desired. Stiffening elements 73 may be introduced in plate 72, as shown in FIG. 4, to strengthen the stack and increase heat transfer surface area. Such members are desirably electrically conductive to further enhance electrical current passage through plate 72.

The thermal control method and arrangement of the invention will be seen to provide several important benefits. Heat transfer is accomplished through sensible heat of process gas and hydrocarbon reforming by using an additional flow of process gas without requiring any separate manifolding system, as is necessary in case of liquid heat transfer medium. Possibility of corrosion by shunt currents and any harmful effects by leakage are completely eliminated. The system reliability is, therefore, much greater than that for liquid heat transfer media. The electrolyte losses by carry-over or vaporization to the process gases are minimized because only a limited amount of process gases contact the electrolyte. Process gases passing through the thermal control plates do not contact the electrolyte, so vapor losses due to flow of heat transfer gases are absent. Electrolyte blockage is averted since all catalyst-promoted reforming takes place in an electrolyte-isolated environment. The thermal control plates can serve as stiffening members, providing additional strength to the stack assembly. Further, if it is required to replace some defective cells during operation, a group of cells between two thermal control plates can be easily removed and new cells can be replaced.

The invention is particularly adapted for use in molten carbonate fuel cells wherein the process gas used also in thermal control is air/carbon dioxide cathode gas mixture and/or hydrogen-rich anode gas mixture containing hydrocarbons and water. Where the hydrocarbon content is methane, a suitable steam-reforming catalyst is nickel or nickel based. A commercially available version of such catlyst is Girdler G-56 and is provided in pellet form for packing in fixed bed type reactors. Suitable nickel catalyst for this purpose and method for making the same is further set forth in U.S. Pat. No. 3,488,226, in which hydrocarbon reforming is carried out in heat exchange relationship to a fuel cell, however in electrolyte-communicative environment.

Various changes in the methods of operation and in the illustrated systems of FIGS. 1-4 may be introduced. By way of example, one may elect to supplement process gas furnished by supply 36 and/or supply 48 (FIG. 1) solely with process gas conducted through electrolyte-isolated passages, rather than the described admixture of gases conducted through both electrolyte-communicative and electrolyte-isolated passages. To implement this variation, cell output gases are not manifolded but, rather, are separately issued with the issuance conduit of the electrolyte-isolated passage being placed in communication with the input manifold serving both types of passages.

Figure 2:
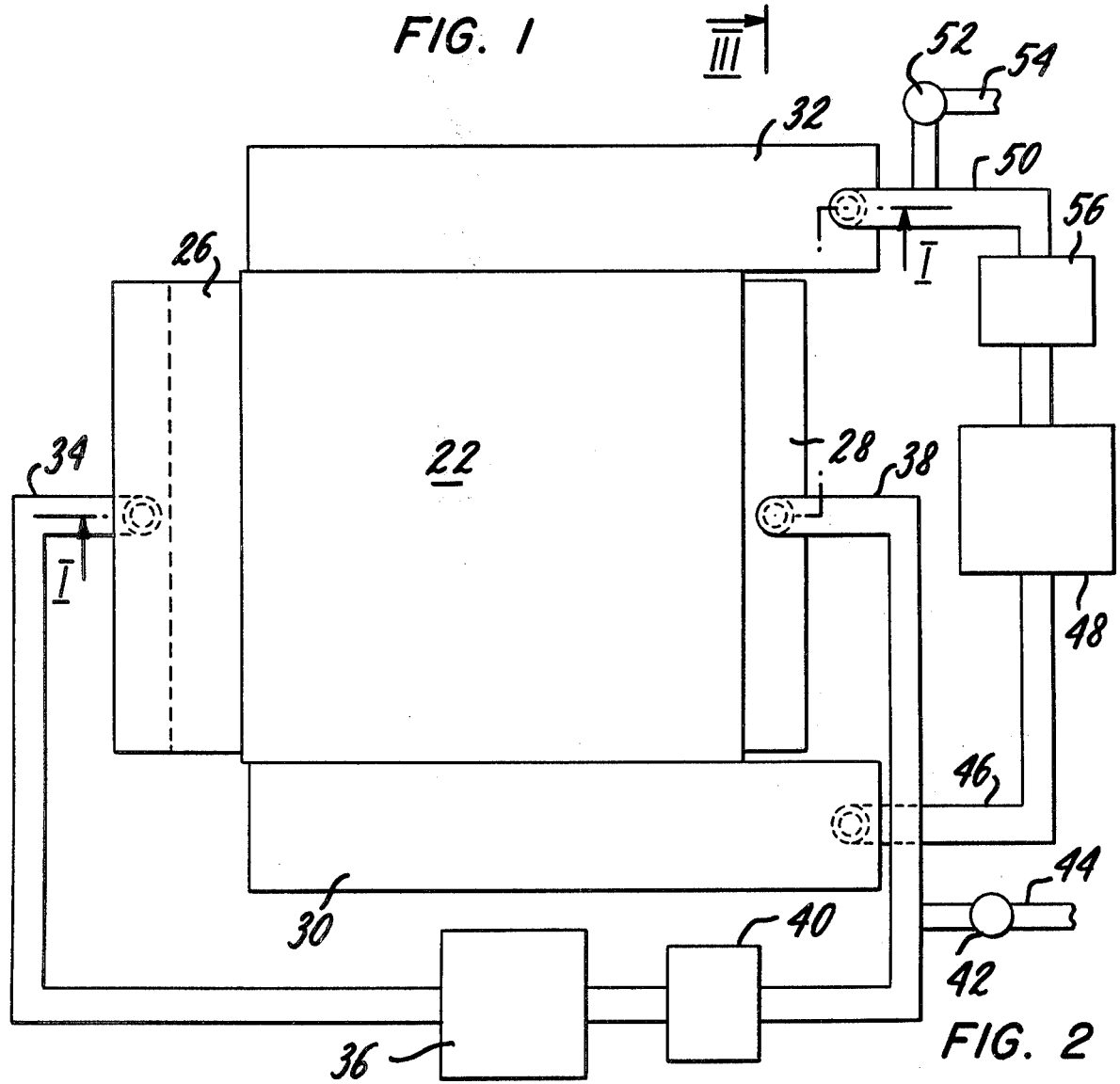
FIG. 2 is a plan elevation of the FIG. 1 fuel cell, shown together with accessory process gas supply and treatment apparatus.

In cascade arrangement of cells constructed as above discussed, the reforming passage gas exiting the first of the series of cells may be supplied to the reaction passage of the second cell. In turn, the reforming passage gas exiting such second cell may be furnished to the reaction passage of the third cell, etc. Gas exiting the reaction passage of such first cell may be admixed with gas exiting the reforming passages, as shown in FIGS. 1-3, or may be separately conducted to the reforming passage of the second cell, etc. Fresh fuel supplied to the first cell may be introduced in any passage in subsequent cells. This method of cascading has the advantage of using product water from previous cells to enhance the steam-reforming of the hydrocarbons. This is particularly important when the entire system is pressurized and the resulting equilibrium favors the formation of hydrocarbons, particularly methane. Another advantage of such cascading is to maintain a higher partial pressure of hydrogen in the fuel cell, thereby allowing more reversible operation.

Figure 5:
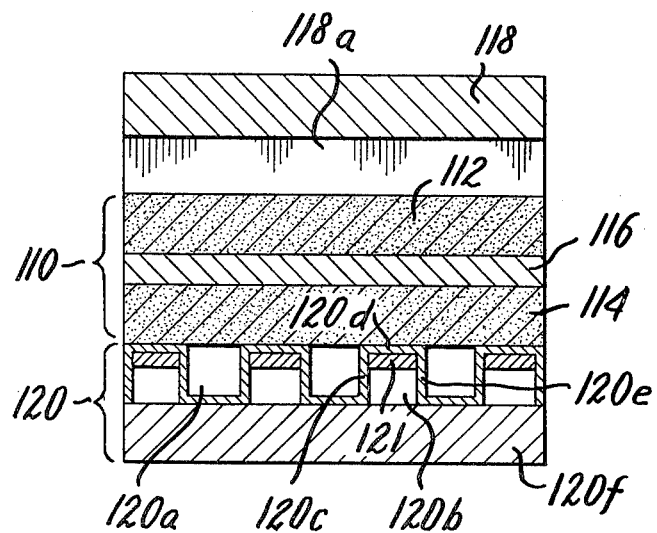
FIG. 5 is a sectional drawing of a further explanatory embodiment of an electrochemical cell in accordance with the invention, as seen from plane VI—VI of FIG. 6.
Figure 6:
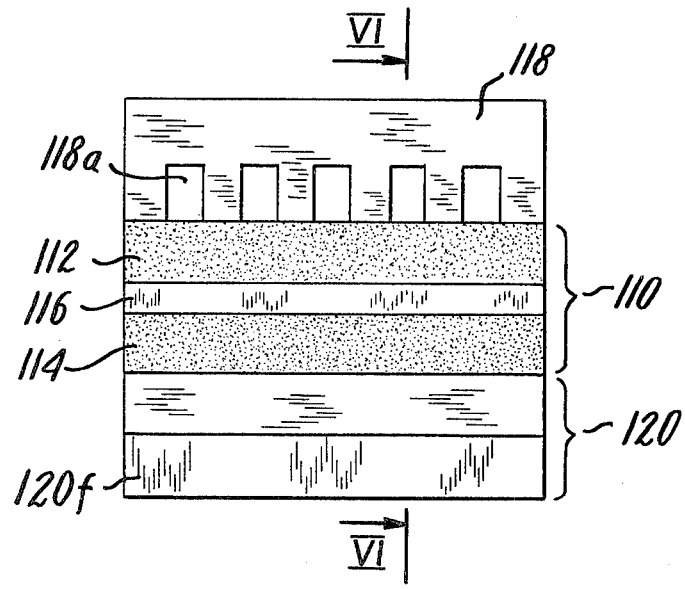
FIG. 6 is a side elevation of the FIG. 5 cell.
Figure 7:
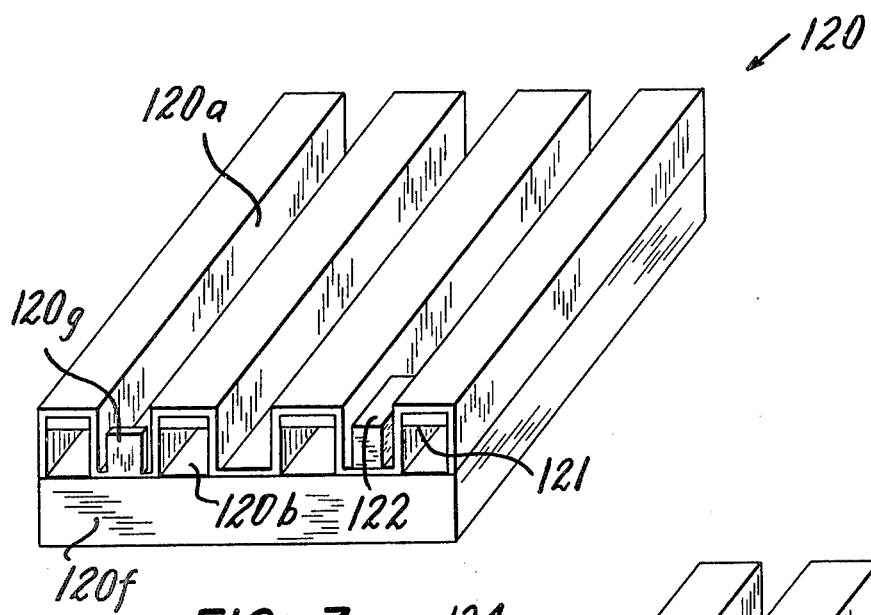
FIG. 7 is a perspective showing of the separator plate employed in the cell of FIGS. 5 and 6.

Referring to FIGS. 5 and 6, fuel cell 110 includes anode and cathode electrodes 114 and 112, of gas diffusion type, and electrolyte matrix or layer 116 therebetween. Separator plate 118 is of design having channel passages 118a, for supplying process gas to cathode electrode 112. Separator plate 120 is constructed to implement this alternate embodiment of the invention and, as shown in the explanatory FIG. 5 single cell embodiment is of unipolar character, defining channel passages 102a, for supplying fuel gas to anode electrode 114. Based on the gas diffusion character of electrodes 112 and 114, passages 118a and 120a constitute electrolyte-communicative passages.

Passages 120b of separator plate 120 are in flow isolation with respect to anode electrode 114, the boundary walls 120c, 120d and 120e of the passages being essentially impermeable to gas and having catalyst 121. Wall 120d is contiguous with electrode 114. Plate 120f is juxtaposed with passages 120b to close the same. Accordingly, passages 120b are in flow isolation with respect to electrolyte 116, and process gas supplied to passages 120b can be conducted through the fuel cell to serve thermal control purposes, by hydrocarbon reforming and sensible heat, without contributing to electrolyte loss or blockage. To the contrary, process gases conducted through passages 118a and 120a give rise to exit gas unavoidably partially saturated with electrolyte vapor. In the illustrated embodiment, passages 120a and 120b are alternately successive in a common plane location as one progresses across that surface of electrode 114 which is contiguous with the crests 120d of electrolyte-isolated catalyst-containing passage 120b.

In the systems of FIG. 1-4, unipolar separator plates, such as plate 18 are used adjacent each of the cell electrodes of a fuel cell. Supplemental process gas to be conducted through electrolyte-isolated passages for thermal control is fed through conduits of further plates which are spaced from the electrodes by the unipolar separator plates. Such conduit-defining further plates are employed in one cell in a succession of cells forming a stack. Since heat removal thus is affected by endothermic reforming reaction and sensible heat of supplemental process gas at somewhat spaced sites, the possibility exists for thermal gradients to be present in substantial measure. Such disadvantage is overcome in the embodiments of FIGS. 5-11, wherein thermal gradients are reduced since heat removal may be accomplished, as desired, from heat-generating surface of each cell.

The unipolar embodiment of separator plate 120 is readily formed by the use of integral sheet material and corrugation of same to form channels defining the respectively diverse passages. While the channels are shown as symmetric in FIGS. 5-7, they can be preselected to have different cross-sectional areas in accordance with the ratio of flows therethrough needed to achieve intended heat removal and electrical energy output. The practice of achieving desired flows in the respective passages may include variation of size and geometry of the flow passages and/or the placement of fixed or variably-settable constrictions in either or both passages. As is shown by way of example in FIG. 7, a partial end wall 120g may be formed in channel 120a, or block-type obstacle 122 may be included therein.

Figure 8:
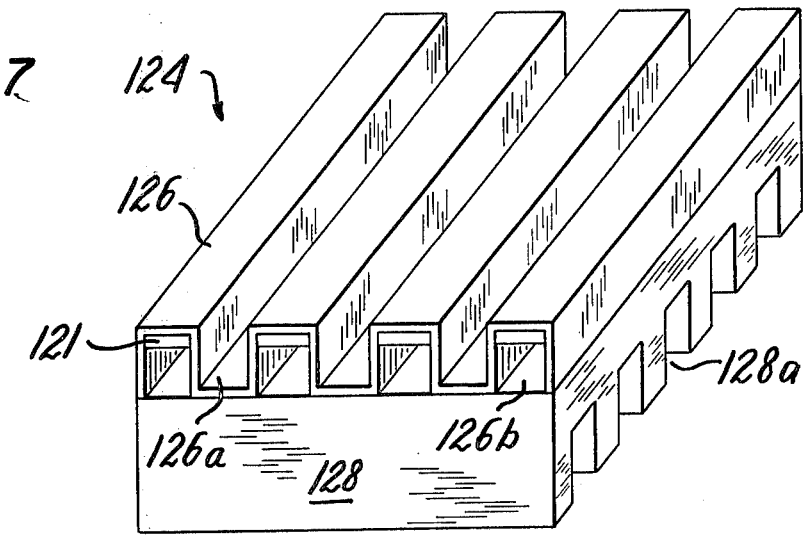
FIGS. 8 and 9 are perspective showings of bipolar separator plates for practicing the invention.
Figure 9:
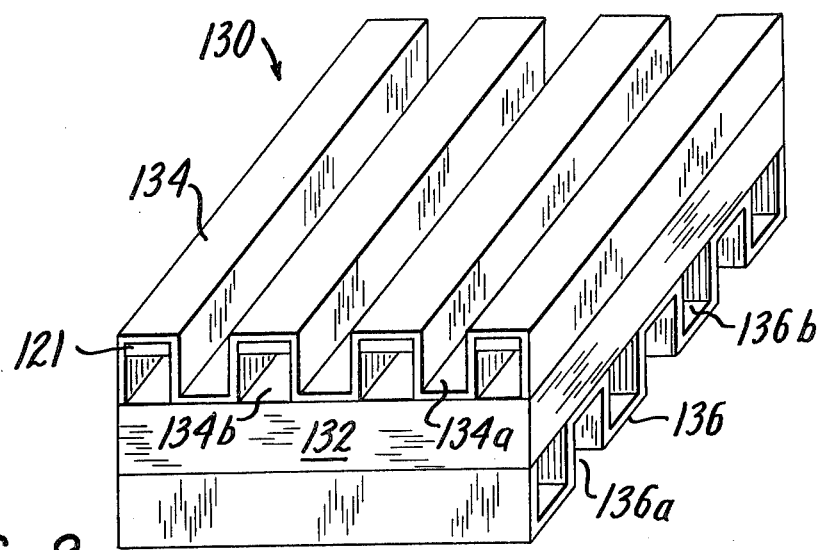
Figure 10:
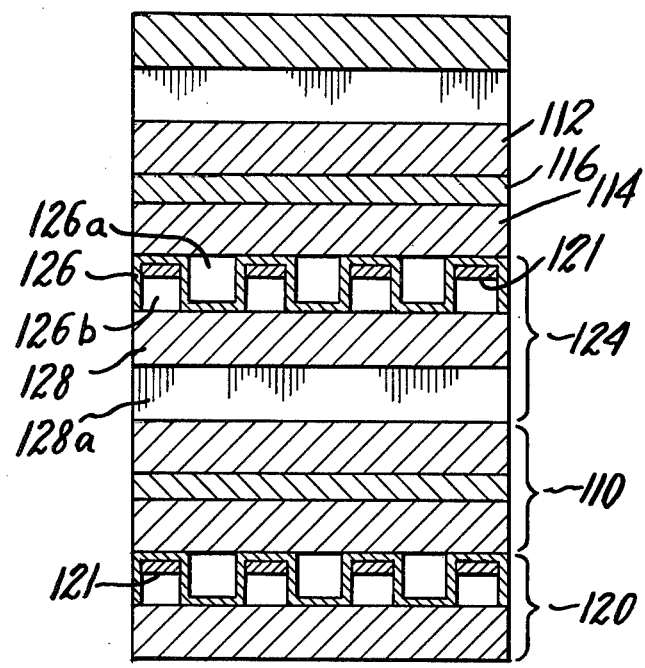
FIG. 10 is a sectional drawing of a fuel cell stack in accordance with the invention.
Figure 11A:
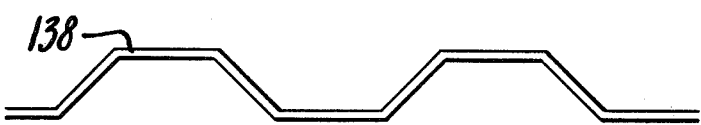
FIGS. 11(a)-(d) are schematic showings of other embodiments of separator plates for practicing the invention.
Figure 11B:
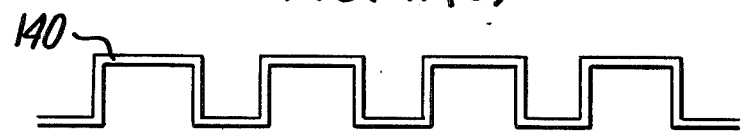
Figure 11C:
Figure 11D:
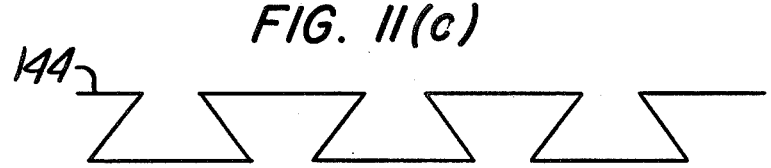

Referring to FIGS. 8 and 9, bipolar plates are shown for implementing the invention. In FIG. 8, bipolar plate 124 includes a corrugated sheet member 126 disposed atop a plate 128 which defines channel passages 128a for process gas. Member 126 has passages 126a (electrolyte-communicative) and 126b (electrolyte-isolated and catalyst-containing).

In bipolar plate 130 of FIG. 9, backing plate 132 supports corrugated sheet members 134 and 136 and closes the electrolyte-isolated passages 134b and 136b thereof. Crisscross electrolyte-communicative passages 134a and 136a serve electrodes juxtaposed therewith (not shown) with process gases. Such FIG. 8 plate is shown in stack usage in the fuel cell stack of FIG. 10.

As the hydrocarbon content of the process gas increases, the in situ reforming predominates the thermal balance in the system and the benefits of higher thermal efficiency of system operation accrue.

The invention will be recognized as providing a highly efficient vehicle for reforming of process gas, separate and apart from thermal control.

As will be appreciated, various changes may be introduced in the foregoing embodiments without departing from the invention. Thus, passage geometry may be varied extensively, as is shown by corrugated sheet members 138-144 illustrated schematically in FIGS. 11(a)-(d). The particularly disclosed embodiments and practices are thus intended in an illustrative and not in a limiting sense. The true spirt and scope of the invention is set forth in the following claims.

What is claimed is:

1. A method for operating an electrochemical cell to produce electrical energy from electochemical reaction between a cell electrolyte and a gas containing a hydrocarbon supplied from a gas supply to a flow passage in said cell in flow communication with said electrolyte, including the steps of:
   (a) establishing a further flow passage for gas from said supply through said cell isolated from said electrolyte and in thermal communication with a heat-generating surface of said cell;
   (b) disposing catalyst promoting endothermic reforming of such hydrocarbon content of said gas in such electrolyte-isolated passage; and
   (c) conducting gas from said gas supply through both such electrolyte-communicative passage and said electrolyte-isolated passage.

2. The method claimed in claim 1 wherein gas conducted through said electrolyte-communicative passage and through said electrolyte-isolated passage is commonly admixed after conductance thereof through said cell.

3. The method claimed in claim 2 including the further step of employing at least part of such common admixture of gas for further supplying of gas to said electrolyte-communicative passage and said electrolyte-isolated passage.

4. The method claimed in claim 3 including the further step of subjecting said common admixture of gas to thermal change prior to such further supplying thereof.

5. The method claimed in claim 4 wherein such thermal change step involves reduction of temperature of said common admixture of gas.

6. The method claimed in claim 1 including the further step of employing at least part of such gas conducted through said electrolyte-isolated passage for further supplying of gas to said electrolyte-communicative passage and said electrolyte-isolated passage.

7. The method claimed in claim 6 including the further step of subjecting such gas part to thermal change prior to such further supplying thereof.

8. The method claimed in claim 7 wherein such thermal change step involves reduction of temperature of said gas part.

9. The method claimed in claim 3 including the further step of removing substance retarding promotive reforming activity of said catalyst from said common admixture of gas prior to said further supplying thereof.

10. The method claimed in claim 6 including the further step of removing substance retarding promotive reforming activity of said catalyst from such gas part prior to said further supplying thereof.

11. The method claimed in claim 1 wherein gas flow level through said cell for gas conducted through such electrolyte-communicative passage is set in accordance with predetermined electrical energy to be produced by said cell and wherein gas flow level through said cell for gas conducted through said electrolyte-isolated passage is set to obtain a predetermined operating temperature range for said cell.

12. An electrochemical cell operative to produce output electrical energy by electrochemical reaction with a process gas containing a hydrocarbon, comprising an electrolyte layer, a gas diffusion electrode, first passage means in said cell for conducting gaseous medium to said gas diffusion electrode for reaction with said electrolyte, second passage means in said cell for conducting gaseous medium through said cell both in isolation from said electrolyte and in thermal communication with a heat-generating surface of said cell, said second passage means including catalyst promotive of endothermic reforming of such hydrocarbon content of said process gas.

13. A system comprising the cell claimed in claim 12 and input manifold means in communication with both said first and second passage means for supplying said process gas thereto.

14. The system claimed in claim 13 further including output manifold means in communication with both said first and second passage means for admixing gas conducted therethrough.

15. The system claimed in claim 14 including conduit means for providing communication between said output manifold means and said input manifold means.

16. The sytem claimed in claim 15 further including means for affecting thermal change in gas conducted through said output manifold means.

17. A system comprising the cell claimed in claim 12 and output conduit means in communication with said second passage means for receiving gas conducted therethrough.

18. The system claimed in claim 17 including further conduit means for providing communication between said output conduit means and said input manifold means.

19. The system claimed in claim 18 further including means for affecting thermal change in gas conducted through said output conduit means.

20. The system claimed in claim 16 wherein such thermal change affecting means comprises heat removal means.

21. The system claimed in claim 19 wherein such thermal change affecting means comprises heat removal means.

22. The system claimed in claim 15 further including means for removing substance retarding promotive reforming activity of said catalyst from gas conducted through said output manifold means.

23. The system claimed in claim 18 further including means for removing substance retarding promotive reforming activity of said catalyst from gas conducted through said output conduit means.

24. The cell claimed in claim 12 wherein said second passage means has a surface thereof contiguous with said electrolyte layer.

25. The cell claimed in claim 24 wherein such first and second flow passage means comprise respective pluralities of first and second flow passages, such first flow passages being separated from one another by such second flow passages alternately progressively across a surface of said electrode with which said second flow passages have such contiguous surface.

26. The cell claimed in claim 25 wherein integral sheet material defines both said first and second flow passages.

27. The cell claimed in claim 26 wherein a corrugated sheet member defines first channels open with respect to said electrode and juxtaposed therewith to constitute said first flow passages and defines second channels successive to said first channels and having crests contiguous with said electrode to constitute said second flow passages.

28. The cell claimed in claim 27 further including a plate member contiguous with the crests of said first channels and serving to close said second channels along the length thereof.

29. The method claimed in claim 1 including the further steps of operating a second such electrochemical cell by repeating said steps (a) and (b) for said second cell and by conducting gas exiting said electrolyte-isolated passage of said first-mentioned cell to the electrolyte-communicative passage of said second cell.

30. The method claimed in claim 29 including the further step of conducting gas exiting said electrolyte-communicative passage of said first-mentioned cell to said electrolyte-communicative passage of said second cell.

31. The method claimed in claim 29 including the further step of conducting gas exiting said electrolyte-communicative passage of said first-mentioned cell to the electrolyte-isolated passage of said second cell.

* * * * *